(12) United States Patent
Neitzel et al.

(10) Patent No.: US 9,737,855 B2
(45) Date of Patent: Aug. 22, 2017

(54) FILTRATION ARTICLE CONTAINING A FILTRATION MATERIAL CONTAINING FIBROUS LAYERS HAVING DIFFERENT LENGTHS

(71) Applicant: W. L. Gore & Associates, Inc., Newark, DE (US)

(72) Inventors: Edward T. Neitzel, Oxford, PA (US); Angus Repper, Lincoln University, PA (US)

(73) Assignee: W. L. Gore & Associates, Inc., Newark, DE (US)

(*) Notice: Subject to any disclaimer, the term of this patent is extended or adjusted under 35 U.S.C. 154(b) by 495 days.

(21) Appl. No.: 14/306,596

(22) Filed: Jun. 17, 2014

(65) Prior Publication Data
US 2015/0360181 A1    Dec. 17, 2015

(51) Int. Cl.
*B01D 39/00* (2006.01)
*B01D 63/06* (2006.01)
(Continued)

(52) U.S. Cl.
CPC ....... *B01D 63/063* (2013.01); *B01D 39/1623* (2013.01); *B01D 39/1692* (2013.01); *B01D 71/36* (2013.01)

(58) Field of Classification Search
CPC ........ B01D 27/00; B01D 27/04; B01D 27/06; B01D 27/07; B01D 27/08; B01D 27/14; B01D 27/146; B01D 27/148; B01D 29/00; B01D 29/002; B01D 29/0004; B01D 29/0018; B01D 29/0022; B01D 29/0025; B01D 29/0093; B01D 29/01; B01D 29/012; B01D 29/016; B01D 29/05; B01D 29/07; B01D 29/50; B01D 29/56; B01D 39/00;
(Continued)

(56) References Cited

U.S. PATENT DOCUMENTS 3,953,566 A   4/1976   Gore
4,588,464 A   5/1986   Miyagi et al.
(Continued)

FOREIGN PATENT DOCUMENTS

EP    0178635      10/1985
EP    1409118      7/2010
WO    WO00/20096   4/2000

*Primary Examiner* — Allison Fitzsimmons
(74) *Attorney, Agent, or Firm* — Kilpatrick Townsend & Stockton, LLP (57) ABSTRACT

A filtration material having a second fibrous layer (downstream drainage layer) with a length that is shorter than the length of the first fibrous material (upstream drainage layer) is provided. At least the first fibrous material is meltable. In forming the filtration material, the second fibrous layer may be cut to a predetermined length while the porous membrane and the first fibrous layer maintain their length. The length of the second fibrous layer may be substantially the same as the length of the outer cage. The filtration material is disposed within the outer cage such that the first fibrous layer and the porous membrane protrude from the cage member. When positioning an end cap onto the filtration material, heat is applied and the first fibrous layer melts and bonds to the end cap at a melt interface. The filtration material is free from thermoplastic strips and imbibed thermoplastic material(s).

20 Claims, 10 Drawing Sheets

(51) Int. Cl.
 *B01D 71/36* (2006.01)
 *B01D 39/16* (2006.01)
 *B01D 63/12* (2006.01)

(58) Field of Classification Search
 CPC ........ B01D 39/08; B01D 39/14; B01D 39/16;
  B01D 39/1607; B01D 39/1623; B01D
  39/1692; B01D 63/00; B01D 63/02;
  B01D 63/021; B01D 63/024; B01D
  63/04; B01D 63/043; B01D 63/06; B01D
  63/08; B01D 69/06; B01D 69/12; B01D
  39/2096; B01D 63/12; B01D 63/14;
  B01D 63/10; B01D 29/0006; B01D
  29/0095; B01D 29/014; B01D 29/11;
  B01D 29/13; B01D 29/15; B01D 29/17;
  B01D 29/19; B01D 29/21; B01D 63/081;
  B01D 63/082
 USPC .. 210/321.6, 321.72, 321.86, 335, 336, 348,
  210/437, 440, 441, 446, 448, 321.87,
  210/321.84, 497.01
 See application file for complete search history.

(56) References Cited

U.S. PATENT DOCUMENTS

| | | |
|---|---|---|
| 4,956,089 A | 9/1990 | Hurst |
| 5,183,545 A | 2/1993 | Branca et al. |
| 5,476,589 A | 12/1995 | Bacino |
| 5,708,044 A | 1/1998 | Branca |
| 5,814,405 A | 9/1998 | Branca et al. |
| 6,186,341 B1 | 2/2001 | Konstantin et al. |
| 6,315,130 B1 * | 11/2001 | Olsen .................... B01D 27/06 210/490 |
| 6,541,589 B1 | 4/2003 | Baillie |
| 7,306,729 B2 | 12/2007 | Bacino et al. |
| 7,531,611 B2 | 5/2009 | Sabol et al. |
| 8,637,144 B2 | 1/2014 | Ford |
| 2003/0006186 A1 | 1/2003 | Pulek et al. |
| 2009/0020472 A1 * | 1/2009 | Lucas .................... B01D 29/21 210/458 |
| 2010/0248324 A1 | 9/2010 | Xu et al. |
| 2010/0320138 A1 * | 12/2010 | Waller, Jr. .......... B01D 39/1623 210/338 |
| 2012/0035283 A9 | 2/2012 | Xu et al. |
| 2014/0021145 A1 | 1/2014 | Propst et al. |
| 2014/0131270 A1 | 5/2014 | Zeiler et al. |

* cited by examiner

//FILTRATION ARTICLE CONTAINING A FILTRATION MATERIAL CONTAINING FIBROUS LAYERS HAVING DIFFERENT LENGTHS

FIELD

The present disclosure relates generally to filtration articles, and more specifically, to a filtration material having a downstream layer with a length that is shorter than the length of the upstream layer and which bonds to an end cap without the inclusion of extraneous thermoplastic material such as thermoplastic strips.

BACKGROUND

Filtration cartridges are well known and are used in the filtration of particulate, ionic, microbial and other contaminants from fluids in pharmaceutical, microelectronics, chemical and food industries. Filtration cartridges typically include a filtration material that has a plurality of longitudinal pleats arranged in a cylindrical configuration, a perforated cage disposed about the outer periphery of the filter element to permit fluid entry into the cartridge, and a perforated core coaxially disposed within the filter material. End caps are positioned at the ends of the filter material to prevent the egress of fluid from the cartridge. The ends of the filtration material are typically sealed by potting the ends of the filtration medium in an end cap, the end cap being in the form of a resin, a molten thermoplastic, or the like during a potting step.

Many filtration devices are constructed entirely of fluoropolymer materials to meet chemical and temperature resistance requirements, such as for use in the fabrication of semiconductors. The filtration material is pleated, and may include upstream and downstream drainage layers that are constructed of fluoropolymeric fiber materials (e.g., polytetrafluoroethylene (PTFE), perfluoroalkoxy alkane (PFA), fluorinated ethylene propylene (FEP), and polyvinylidene fluoride (PVDF) in the form of woven materials, non-woven materials, or nets.

Conventional methods to produce a high integrity seal between the end cap and the porous fluoropolymer membrane incorporate a meltable thermoplastic strip, such as a strip of FEP or PFA, at the two peripheral edges of the filtration material. Typically, these thermoplastic strips are about 6 to 13 mm in width and are located between the porous membrane and the downstream and/or upstream support layer. Ends of the filtration devices are joined to an end cap via a hot melt process which embeds the porous membrane edges in an adhesive bond to the end cap by thermoplastic bonding with the thermoplastic strip.

In some high purity filtration applications, such as applications that may be sensitive to contamination from extraneous materials, it may be undesirable to use strips of thermoplastic or imbibe a portion of the filtration medium with a thermoplastic material. In addition, in conventional devices, the filtration material protrudes from the filtration device the same or approximately the same distance. If dissimilar materials are used for the upstream and downstream drainage layers, when heated, the one of the drainage layers and the porous membrane layer may retract away from the cut interface into the device, thereby leaving only the other drainage layer at the embed interface between the end cap and filtration material. In such a situation, the porous membrane does not contact the end cap components, which results in an inadequate seal between the end cap and the filtration material.

Thus, there exists a need in the art for a filtration material that forms a high integrity seal between the porous membrane and the end caps without the use of a thermoplastic strip or an imbibed thermoplastic material.

SUMMARY

One embodiment of the invention relates to a filtration material that includes a first fibrous layer having a first length, a second fibrous layer having a second length, and a non-meltable porous membrane having the same length as the first fibrous layer. The non-meltable porous membrane is positioned between the first and second fibrous layer. The second length is less than the first length. The first fibrous layer and the porous membrane may extend a distance from about 1 mm to about 50 mm from the non-meltable second fibrous layer. The melting point of the first fibrous layer is less than the melting point of the second fibrous layer. In some embodiments, the second fibrous layer is non-meltable. The filtration material is free of additional thermoplastic material, such as, but not limited to thermoplastic strips, imbibed or otherwise added thermoplastic material, and/or a meltable fluoropolymer material found in conventional filtration materials. In exemplary embodiments, the porous membrane is polytetrafluoroethylene or expanded polytetrafluoroethylene. The first and second fibrous layers may be a woven material, a non-woven material, or a knit material.

A second embodiment of the invention relates to a filter cartridge assembly that includes an outer cage, a filtration material having a cylindrical or tubular configuration concentrically positioned within the outer cage, an inner core member disposed within the filtration material, and an end cap bonded to the first and second ends of the cylindrical filtration material. The filtration material has a pleated configuration within the outer cage. The filtration material includes a first fibrous layer having a first length, a second fibrous layer having a second length, and a non-meltable porous membrane having the same length as the first fibrous layer. The non-meltable porous membrane is positioned between the first fibrous layer and the second fibrous layer. The second length is less than the first length. In exemplary embodiments, the second fibrous layer has the same or substantially the same length as the outer cage and the first fibrous layer and porous membrane protrude from the outer cage by a distance (d). The distance (d) may be greater than or equal to about 5 mm. The melting point of the first fibrous layer is less than the melting point of the second fibrous layer. In some embodiments, the second fibrous layer is non-meltable. Unlike conventional filtration materials, the inventive filtration material is free of additional thermoplastic material. In exemplary embodiments, the porous membrane is polytetrafluoroethylene or expanded polytetrafluoroethylene. The first and second fibrous layers may be a woven material, a non-woven material, or a knit material.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

GLOSSARY

As used herein, the phrase "additional thermoplastic material" is meant to include, but is not limited to, thermoplastic strips, imbibed or absorbed thermoplastic material, or any thermoplastic material utilized in addition to the fibrous layers to form a seal or otherwise melt to bond to an end cap.

As used herein, the term "meltable" is meant to denote a material that, upon heating to its melt temperature, becomes molten and/or flowable, and when cooled to below its melting temperature, the material solidifies.

DETAILED DESCRIPTION

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting. The terms "filtration material" and "filtration medium" may be used interchangeably herein.

Figure 1A:
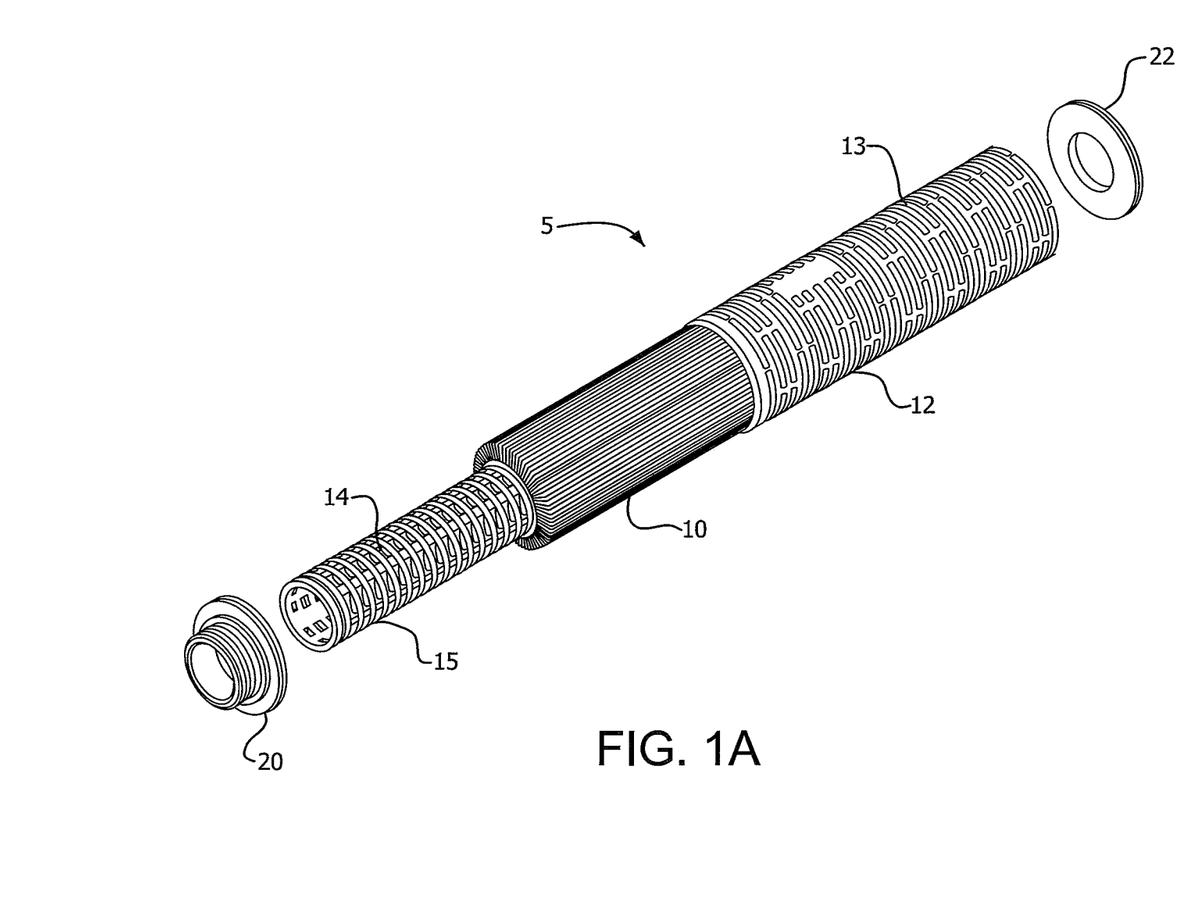
FIG. 1A is an exploded view of a filtration device containing a pleated filtration medium in accordance with an embodiment of the present invention.

FIG. 1A is an illustration of a filtration article 5 that may be constructed wholly of fluoropolymer materials and which may be sized for positioning within a filtration capsule (not shown). The filtration article 5 includes an outer cage 12 that has a plurality of apertures 13 through the surface of the outer cage 12 to enable fluid flow through the outer cage 12, e.g., laterally through the surface of the outer cage 12. A filtration medium 10 to filter unwanted particulates from a fluid stream is concentrically disposed within the outer cage 12. In addition, an inner core member 14 is disposed within the cylindrical filtration medium 10. The inner core member 14 is also substantially cylindrical and includes apertures 15 to permit a fluid stream to flow through the inner core member 14, e.g., laterally through the surface of the inner core member 14. Thus, the filtration medium 10 is disposed between the inner core member 14 and the outer cage 12.

The filtration device 5 further includes end cap components 20, 22 disposed at opposite ends of the filtration cartridge 5. The end cap components 20, 22 may include apertures (not illustrated) to permit fluid communication with the inner core member 14. Thus, fluid may flow into the filtration cartridge 5 through the apertures and into the inner core member 14. Under sufficient fluid pressure, fluid will pass through apertures 15, through the filtration medium 10, and exit the filtration device 5 through the apertures 13 of the outer cage 12. When the filtration device 5 is assembled, the end cap components 20, 22 are potted onto the filtration medium 10 with the outer cage 12 and the inner core member 14 disposed between the end cap components 20, 22. The assembled filtration device 5 (e.g., with the end cap components potted onto the filtration medium) may then be used in a filtration device such as a filtration capsule.

It is to be appreciated that various other configurations of filtration devices may be utilized in accordance with the present disclosure, such as non-cylindrical (e.g., planar) filtration devices. Further, although the flow of fluid is described as being from the outside of the filtration device to the inside of the filtration device (e.g., outside-in flow), it is also contemplated that in some applications fluid flow may occur from the inside of the filtration device to the outside of the filtration device (e.g., inside-out flow).

Figure 1B:
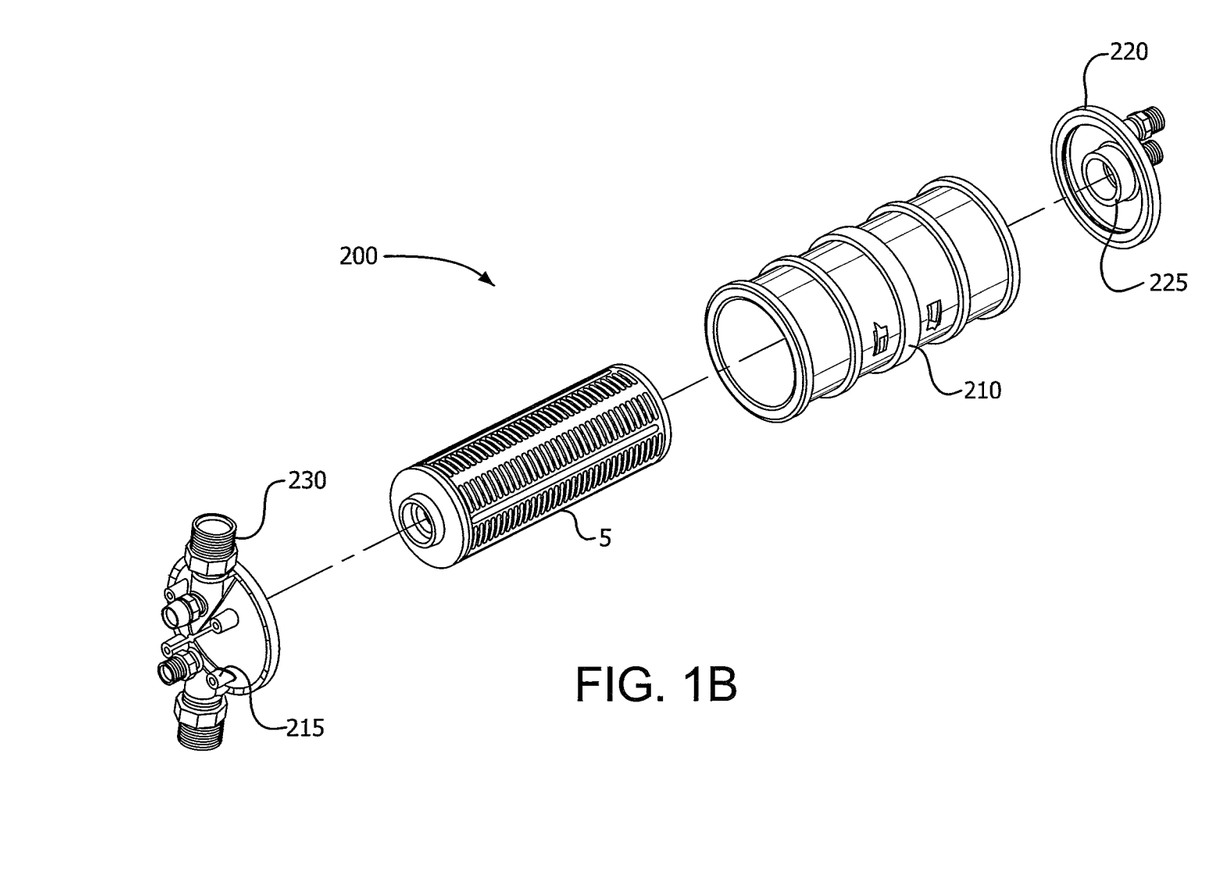
FIG. 1B is an exploded view of a filtration cartridge containing the filtration device of FIG. 1A.

To assemble the filtration capsule 200, the filtration device 5 is disposed within a cylindrical barrel 210 and a barrel head 215 and a barrel bottom 220 are attached to the barrel 210, such as, for example, by welding. When so assembled, the head 215 and the bottom 220 also form a fluid seal with the filtration device 5, such as through use of a flange (e.g., flange 225). The head 215 and the bottom 220 may be provided with various fluid inlet and outlet ports (e.g., fluid port 230) to direct the fluid flow out of or in to the filtration device 5. In use, a fluid stream (e.g., a liquid stream) may be directed into the filtration device 5, such as through the outer cage 12, through the filtration medium 10, and into the inner core member 14. The filtered fluid stream, having passed through the filtration medium 108, may then be extracted from the filtration capsule 200 through a fluid outlet port.

The filtration material 10 includes at least a first layer of a porous membrane (e.g. a porous fluoropolymer membrane) and at least a one fibrous layer that is configured to support the porous membrane and/or is configured to provide drainage of fluid away from the membrane. Further, one or both ends of the porous membrane and fibrous layer of filtration article 5 may be potted to sealably interconnect the end(s) of the filtration medium 10.

The porous membrane within the filtration medium is configured to separate particles from a fluid stream when the porous membrane is positioned in the fluid stream. For example, the porous membrane may have a pore size and pore size distribution that is configured to remove particles having from the fluid stream. It is to be appreciated that the porous membrane may include a single membrane layer or multiple membrane layers. In one or more embodiment, the porous membrane is a fluoropolymer membrane such as, for example, a polytetrafluoroethylene (PTFE) membrane or an expanded polytetrafluoroethylene (ePTFE) membrane. Expanded polytetrafluoroethylene (ePTFE) membranes prepared in accordance with the methods described in U.S. Pat. No. 7,306,729 to Bacino et al., U.S. Pat. No. 3,953,566 to Gore, U.S. Pat. No. 5,476,589 to Bacino, or U.S. Pat. No. 5,183,545 to Branca et al. may be used herein. It is to be understood that throughout the application, the term PTFE may also include expanded PTFE, expanded modified PTFE, and expanded copolymers of PTFE, as described in U.S. Pat. No. 5,708,044 to Branca, U.S. Pat. No. 6,541,589 to Baillie, U.S. Pat. No. 7,531,611 to Sabot et al., U.S. Pat. No. 8,637,144 to Ford and U.S. Patent Publication No. 2010/0248324 to Xu et al.

The porous membrane may include multiple membrane or drainage layers, such as, for example, a middle layer that includes an expanded functional fluoropolymer membrane including a copolymer of tetrafluoroethylene (TFE) and perfluorosulfonyl vinyl ether (PSVE) made generally according to the teachings of U.S Patent Publication No. 2012/035283 to Xu et al. and outer layers that include expanded polytetrafluoroethylene (ePTFE) membranes that may be made generally according to the teachings of U.S. Pat. No. 5,814,405 to Branca, et al. The outer layers may be attached to the first and second fibrous layers using conventional heat and/or pressure lamination techniques.

The porous membrane may also be formed of an expanded polymeric material comprising a functional tetrafluoroethylene (TFE) copolymer material having a microstructure characterized by nodes interconnected by fibrils, where the functional TFE copolymer material includes a functional copolymer of TFE and PSVE (perfluorosulfonyl vinyl ether), or TFE with another suitable functional monomer, such as, but not limited to, vinylidene fluoride (VDF). The functional TFE copolymer material may be prepared, for example, according to the methods described in U.S. Patent Publication No. 2010/0248324 to Xu et al. or U.S. Patent Publication No. 2012/035283 to Xu et al.

A fibrous layer is positioned adjacent to and downstream of the porous membrane to provide support for the porous membrane. The fibrous layer in the filtration medium includes a plurality of fibers (e.g., fibers, filaments, yarns, etc.) that are formed into a cohesive structure. The fiber layer may be a woven structure, a nonwoven structure, or a knit structure. In one particular embodiment, the fibrous layer is a knit structure. The fibrous layer may provide support for the porous membrane and/or may provide fluid drainage for the filtration medium 10. The fibrous layer may be formed of fibers or strands of fluoropolymers, such as polytetrafluoroethylene (PTFE), fluorinated ethylene propylene (FEP), perfluoroalkoxy alkane (PFA), and polyvinylidene fluoride (PVDF). In one or more embodiments, the fibrous layer includes PTFE fibers, such as, for example, a PTFE knit layer. In one exemplary embodiment, the first fibrous layer may include a perfluoroalkoxy alkane (PFA) woven layer and the second fibrous layer may include a knit made of polytetrafluoroethylene fibers, such as those made in accordance with the teachings of U.S. Publication No. 2014/0021145 to Propst, et al.

The filtration material may also include a second fibrous layer, and may be formed from fibers or strands of fluoropolymers as discussed above. In one exemplary embodiment, the second fibrous layer is a knit structure that is fabricated from fibers or strands of a fluoropolymer material such as PTFE. The second fibrous layer may be disposed on an opposite side of the first fibrous layer such that the membrane layer is positioned between the two fibrous layers. In one embodiment, one of the fibrous layers provides support for the membrane layer while the other fibrous layer provides a drainage function to facilitate drainage of fluid away from the membrane layer.

The components of the filtration device 5, including the outer cage 12, the inner core member 14, and the end cap components 20, 22, may be fabricated from a fluoropolymer, and in particular, may be fabricated from a thermoplastic fluoropolymer. Non-limiting examples of suitable thermoplastic fluoropolymers such as perfluoroalkoxy alkane (PFA), fluorinated ethylene propylene (FEP), ethylene tetrafluoroethylene (ETFE), polychlorotrifluoroethylene (PCTFE), ethylene chlorotrifluoroethylene (ECTFE), and polyvinylidene fluoride (PVDF). It is to be noted that fluoropolymers are particularly useful for the filtration of chemically corrosive fluids, such as during semiconductor manufacture.

In at least one exemplary embodiment, the filtration material within the filtration device has a pleated configuration. The pleated filtration material may have a generally cylindrical or tubular configuration with outwardly-projecting pleats having an inverted V-shaped configuration that are positioned about and extend non-linearly along a longitudinal axis from end-to-end of the filtration material. The pleats define V-shaped regions, or valleys, between adjacent ones of the pleats about and along the longitudinal axis of the article. It is to be appreciated that other types and/or shapes of pleats may be used instead of, or in conjunction with, a pleat that has a generally V-shaped configuration, and that such pleats and pleat forms are considered within the purview of the invention.

Figure 2A:
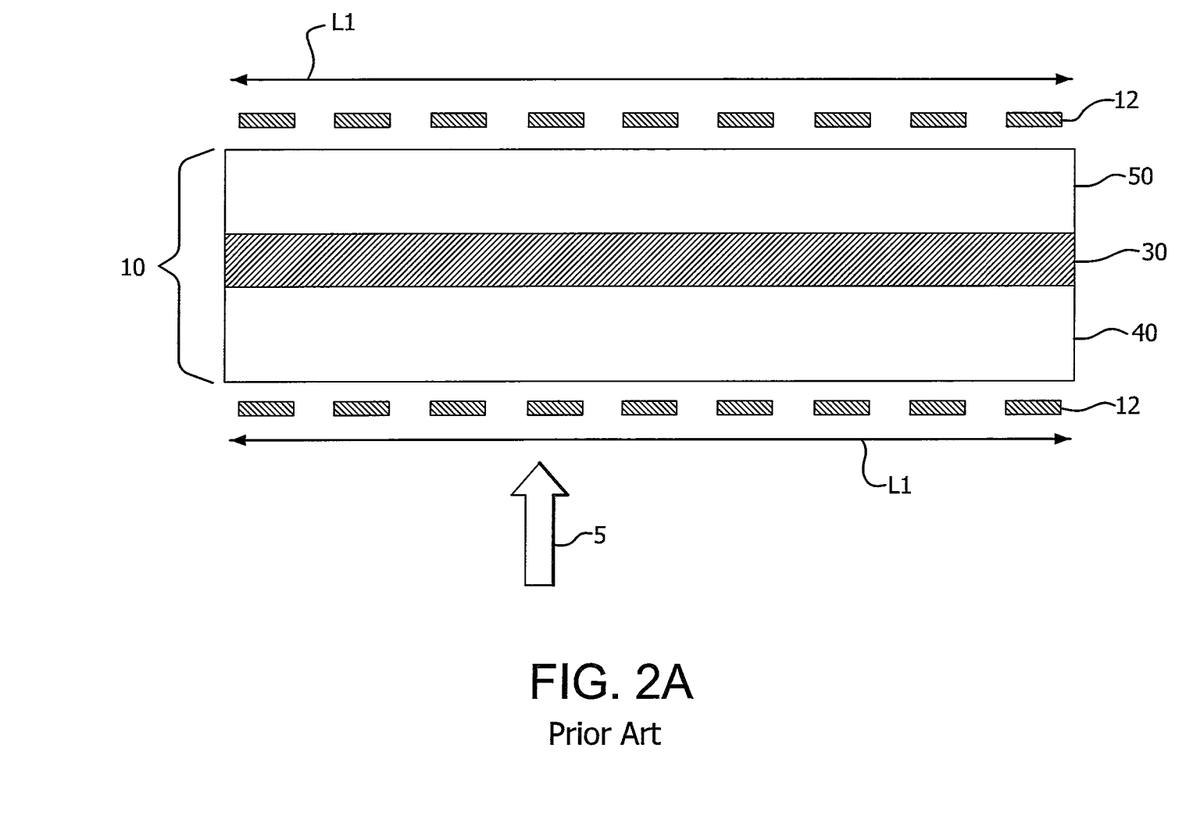
FIG. 2A is a schematic illustration of layers of material within a conventional filtration material disposed in an outer cage.
Figure 2B:
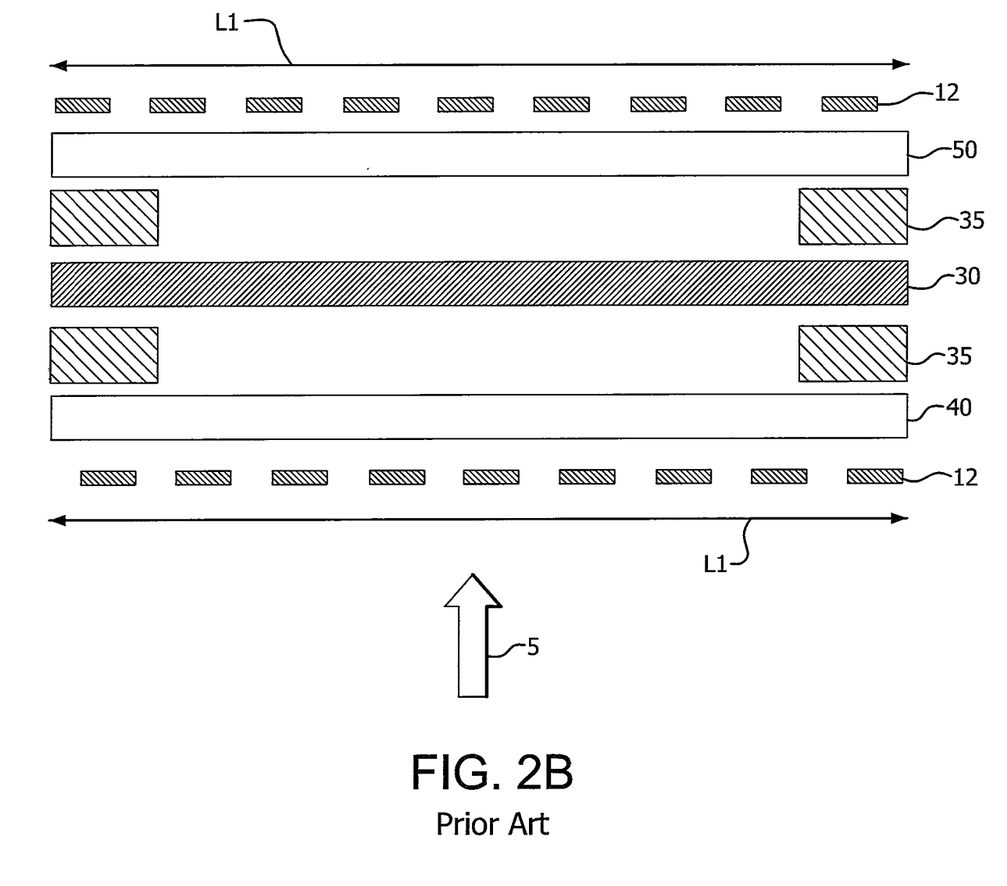
FIG. 2B is a schematic illustration of thermoplastic strips positioned within a conventional filtration material that is disposed within an outer cage.

FIG. 2A depicts one exemplary orientation of the layers of materials forming a conventional filtration material. The arrow 5 depicts the direction of fluid flow through the filtration material 10. As shown, the filtration material 10 may include a porous membrane 30, a first fibrous layer 40 forming an upstream drainage layer and a second fibrous layer 50 forming a downstream drainage layer. The filtration material 10 may further include a thermoplastic material that is imbibed (e.g., infiltrated) within the filtration medium 10 along at least one end of the filtration medium 10 or thermoplastic strips to permit bonding to the end caps. FIG. 2B depicts a conventional filtration material with thermoplastic strips 35 positioned at opposing ends of the filtration material 10. The first fibrous layer 40, the porous membrane 30, and the second fibrous layer 50 have the same length or substantially the same length (L) as the outer cage member 12 in which the filtration medium 10 is disposed.

Figure 3:
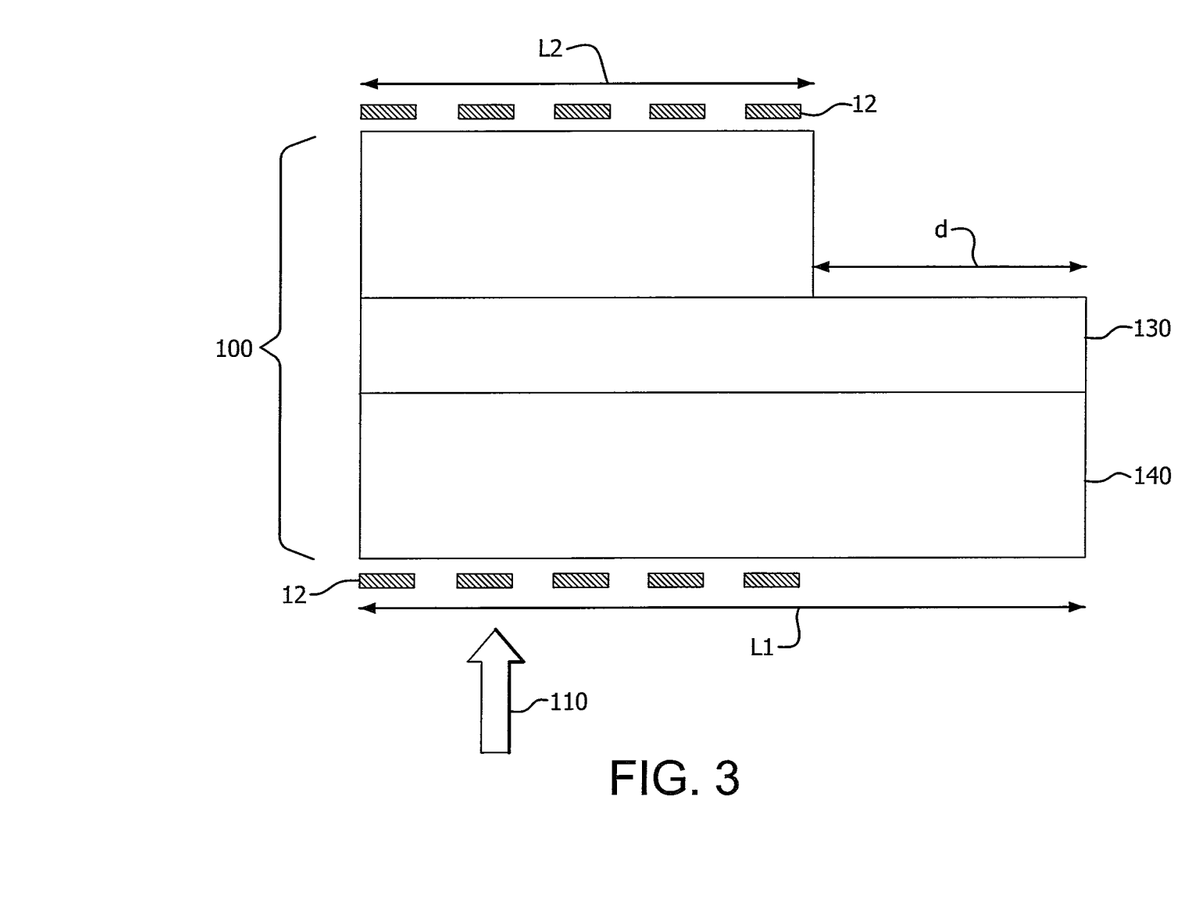
FIG. 3 is a schematic illustration of layers of material within a filtration medium disposed in an outer cage where the second fibrous layer has a length that is shorter than the first fibrous layer according to at least one embodiment of the present invention.

FIG. 3 schematically depicts an orientation of the layers of a filtration medium 100 positioned within the outer cage 12 in accordance with one embodiment of the invention. As shown, the filtration material 100 includes a porous membrane 130, a first fibrous layer 140 forming an upstream drainage layer and a second fibrous layer 150 forming a downstream drainage layer disposed within a cylindrical outer cage member 12. Arrow 110 depicts the direction of fluid flow through the filtration material. It is to be appreciated that the membrane layer 130 may include multiple membrane layers (not illustrated). It is also to be appreciated that the filtration material according to the present invention is free of additional thermoplastic material.

As used herein, the phrase "additional thermoplastic material" is meant to include, but is not limited to, thermoplastic strips, a bonded, imbibed or absorbed thermoplastic material, or any thermoplastic material utilized in addition to the fibrous layers to form a seal or otherwise melt to bond to an end cap. "Additional thermoplastic material" is also meant to include a meltable fluoropolymer that may be added to the filtration material and subsequently melted or melted and subsequently added to the filtration material to bond the filtration material to the end cap. Non-limiting examples of thermoplastic materials that may be used as an "additional thermoplastic material" include, but are not limited to, meltable fluoropolymers fluorinated ethylene propylene (FEP)), perfluoroalkoxy alkane (PFA), polyvinylidene fluoride (PVDF), perfluoro methyl alkoxy (MFA), and a terpolymer of TFE, hexafluoropropylene, and vinylidene fluoride (THV).

In the filtration material 100, the second fibrous layer 150 has a length (L2) that is shorter than the length (L1) of the first fibrous material 140 and the porous membrane 130. In forming the filtration material 100, the second fibrous layer 150 may be cut to a predetermined length (L2) while the porous membrane 130 and the first fibrous layer 140 maintain the length (L1). In exemplary embodiments, length L2 is the same or substantially the same length as the outer cage 12. The filtration medium 100 is disposed within the cage member 12 such that the first fibrous layer 140 and the porous membrane 130 protrude from the cage member 12 by a distance (d). In one or more exemplary embodiment, the distance (d) may range from about 1 mm to about 50 mm, from about 10 mm to about 40 mm, from about 5 to about 30, from about 1 mm to about 25 mm, from about 5 mm to about 20 mm, or from about 9 mm to about 13 mm. Alternatively, the first fibrous layer and the porous membrane may extend from the cage a distance of at least 1 mm, at least 5 mm, at least 10 mm, at least 15 mm, at least 20 mm, or at least 25 mm, or greater. It is to be appreciated that the above-identified ranges are exemplary in nature and include any and all ranges therebetween.

Figure 4:
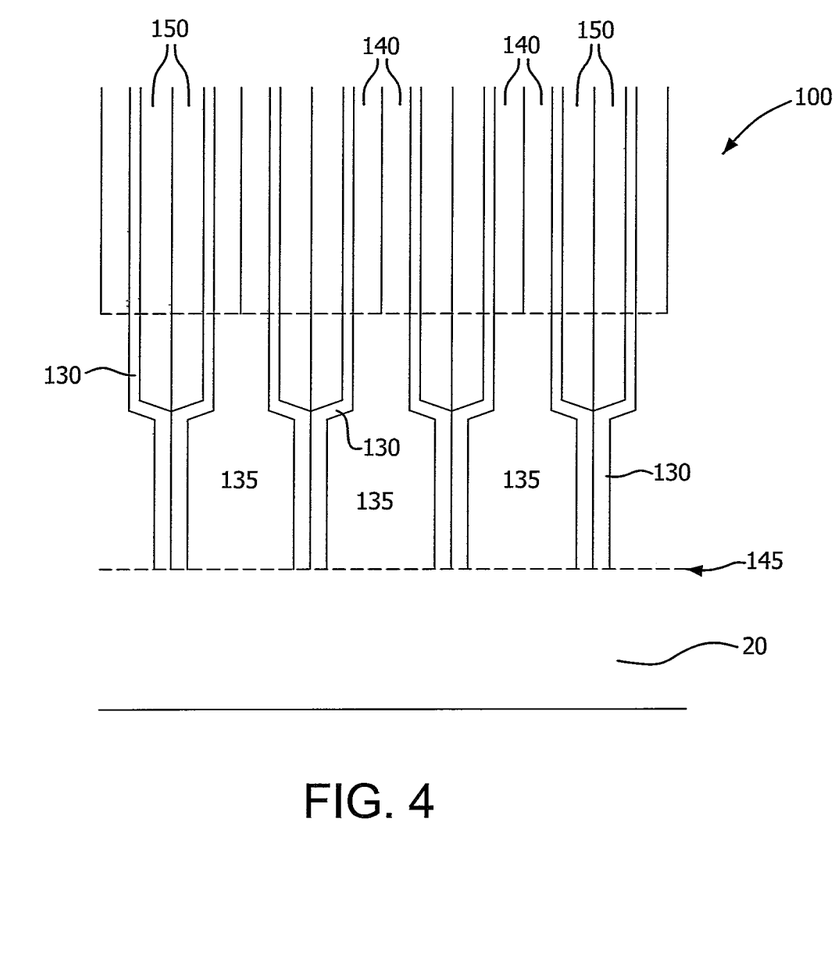
FIG. 4 is a schematic illustration of the filtration material where the first fibrous layer is meltable and the second fibrous layer is non-meltable and which is bonded to an end cap in accordance with an embodiment of the invention.

In one exemplary embodiment depicted in FIG. 4, the first fibrous layer 140 and the second fibrous layer 150 have dissimilar melt temperatures. For example, the first fibrous layer 140 (i.e., upstream drainage layer) is meltable and the second fibrous layer 150 (i.e., downstream drainage layer) is non-meltable. Meltable as used herein is meant to denote a material that, upon heating to its melt temperature, the material becomes molten and/or flowable and when cooled to below its melting temperature, the material solidifies. It is to be appreciated that the first fibrous layer 140 may have alternatively have a melt temperature that is lower than the second fibrous layer 150. The melt temperatures should be sufficiently distinct from each other such that when the filtration material is heated to bond with an end cap, the first fibrous layer will melt before the second fibrous layer.

Figure 5:
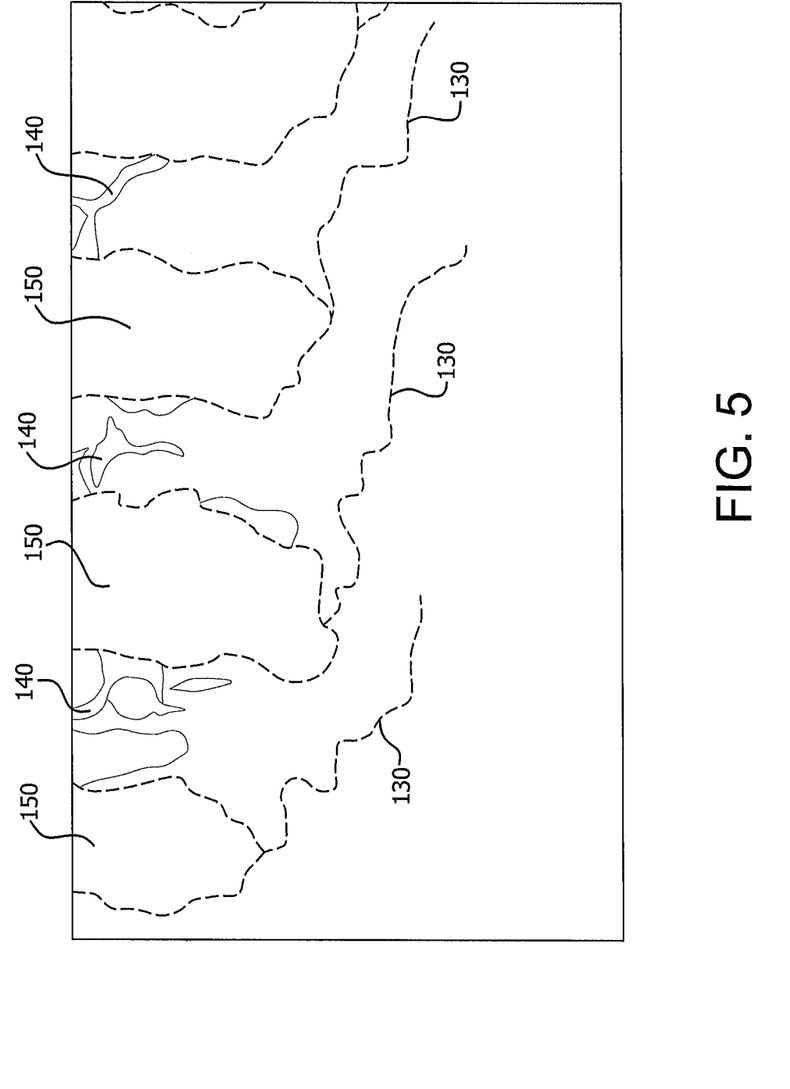
FIG. 5 is a photographic depiction of a filtration material bonded to an end cap where the first fibrous layer is meltable and the second fibrous layer is non-meltable with a dashed line superimposed over the porous membrane for ease of illustration.

When positioning an end cap onto such a filtration material 100, heat is applied and the meltable first fibrous layer 140 melts and bonds to the end cap 20 at a melt interface 145. Because the meltable first fibrous layer 140 extends a distance (d) beyond the non-meltable second fibrous layer 150, a melted region 135 within the filtration material 100 is formed. The melted region 135 formed from the first fibrous layer 140 at least partially encapsulates the porous membrane 130. It can be seen in FIG. 4 that once the first fibrous layer 140 has melted, the non-meltable second fibrous layer 150 extends a distance beyond the first fibrous layer 140 into the melted region. A high integrity seal is thus formed between the porous membrane 130 and the end cap 20. A photograph depicting such a filtration material bonded to an end cap is illustrated in FIG. 5. Dashed lines have been superposed over the porous membrane 130 for ease of illustration. As shown, the porous membrane 130 is embedded or otherwise encapsulated within the melted first fibrous layer.

Figure 6:
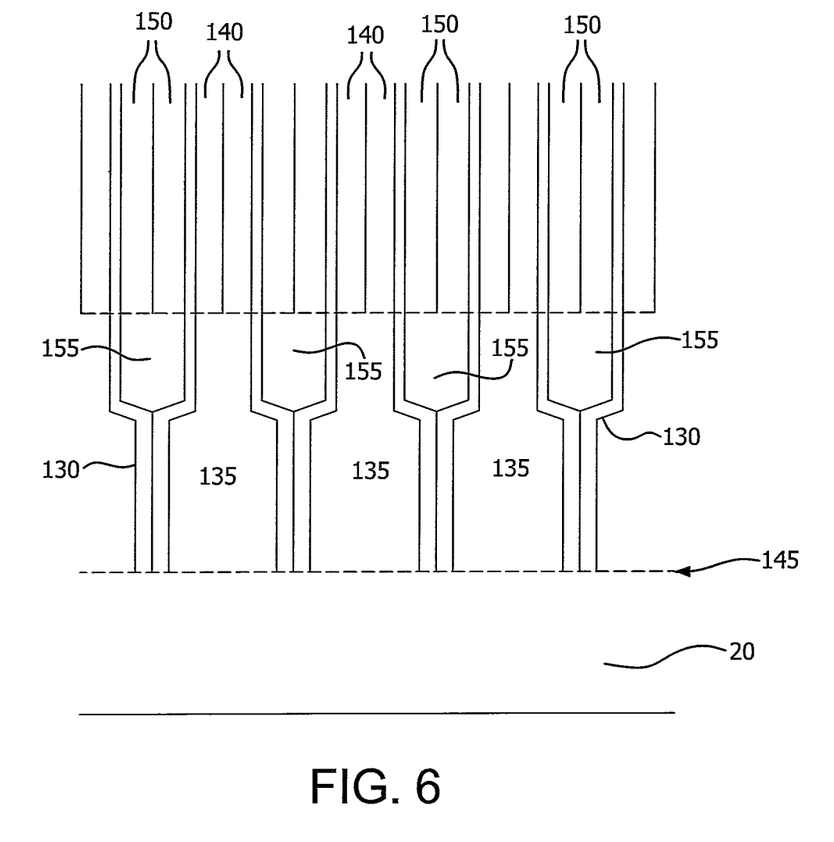
FIG. 6 is a schematic illustration of a filtration material where the first and second fibrous layers are meltable and which is bonded to an end cap according to an embodiment of the invention.
Figure 7:
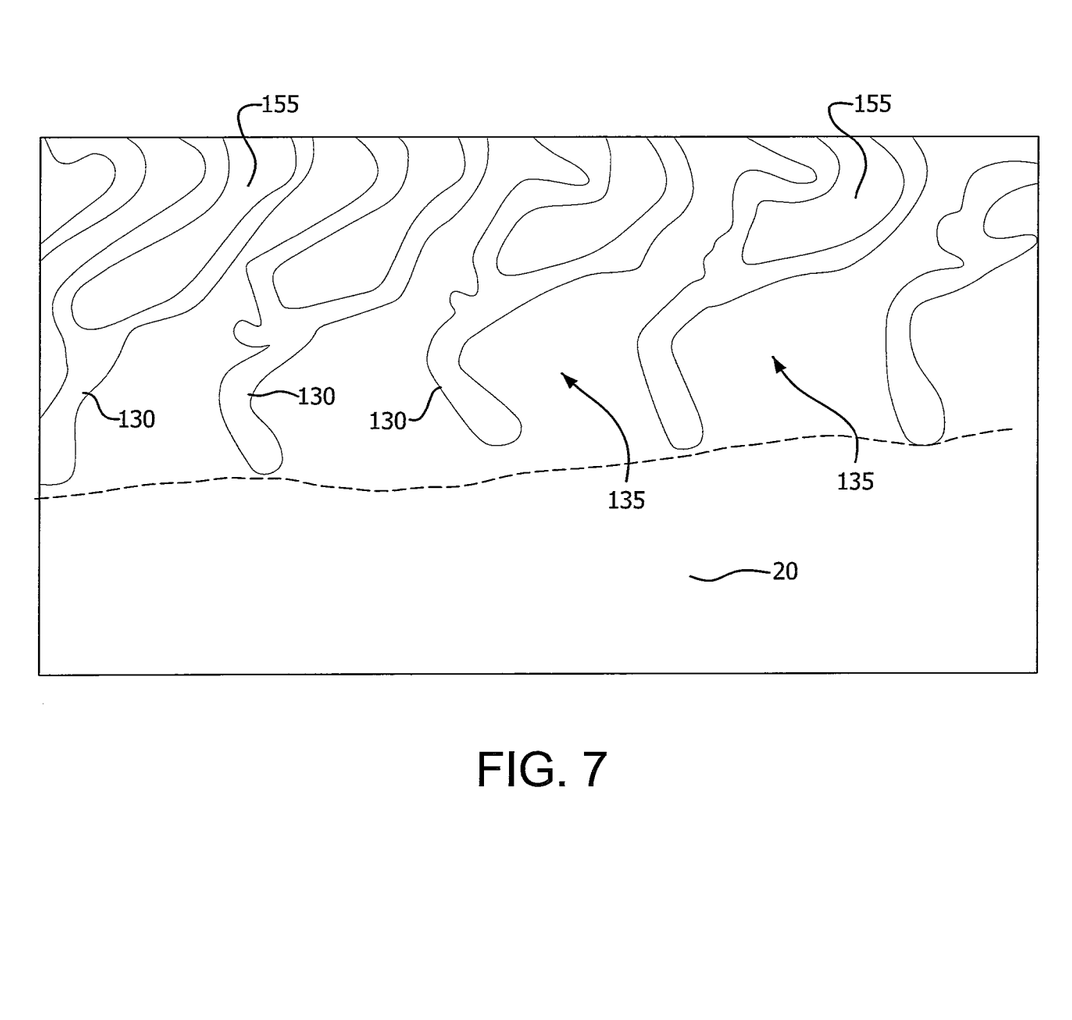
FIG. 7 is a photographic depiction of the filtration material bonded to an end cap where the first and second fibrous layers are meltable according to an embodiment of the invention.

In an alternate embodiment, the first fibrous layer 140 and the second fibrous layer 150 have similar melt characteristics (e.g. the same or close to the same melt temperature). In at least one embodiment illustrated in FIG. 6, the first fibrous layer 140 and the second fibrous layer 150 have the same or substantially the same melt temperature. When positioning an end cap onto filtration material 100 with meltable upstream and downstream drainage layers, the meltable first fibrous layer 140 melts and bonds to the end cap 20 at a melt interface 145. The incited first fibrous layer 140 forms a melted region 135 that encapsulates the porous membrane 130. In addition, a portion of the second fibrous material 150 melts and forms a second melted region 155. It is to be appreciated that the first and second melted regions 135, 155, respectively, may include melted material from both the first and second fibrous layers 140 and 150. The second melted region further seals and reinforces the bond between the end cap 20 and the filtration material 100. It can be seen in FIG. 6 that the first fibrous layer 140 and second fibrous layer 150 have melted away from the cut interface such that the meltable second fibrous layer 150 and the meltable first fibrous layer have an approximately equal length. A high integrity seal is thus formed between the porous membrane 130 and the end cap 20. FIG. 7 is a photograph illustrating the melted fibrous material 100 and the first and second melted regions 135, 155.

Figure 8:
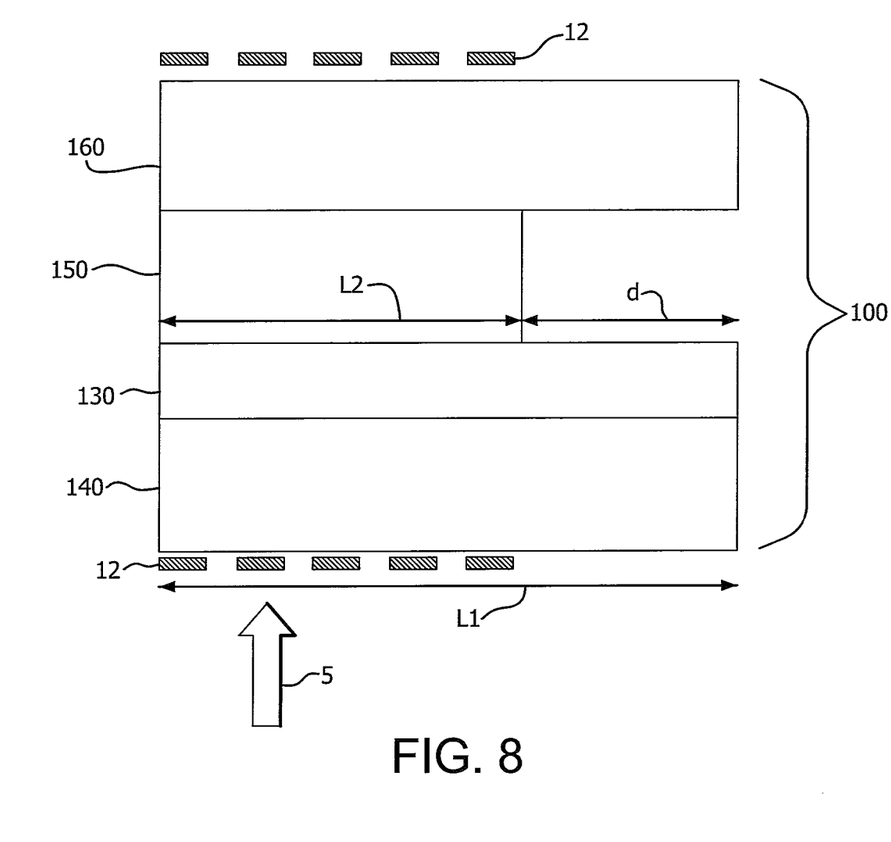
FIG. 8 is a schematic illustration of layers of material within a filtration medium including a third fibrous layer where the fibrous material is disposed in an outer cage and where the second fibrous layer has a length that is shorter than the length of the first and third fibrous layers according to at least one embodiment of the present invention.

In an alternate embodiment illustrated in FIG. 8, a third fibrous layer 160 may be positioned on the second fibrous layer 150 on a side opposing the porous membrane 130. The third fibrous layer may be formed from fibers or strands of fluoropolymers as discussed above with respect to the first and second fibrous layers. The third fibrous layer 160 has a length that is the same or substantially the same as the first fibrous layer 140 and the porous membrane 130 (L1). The third fibrous layer 160 has a melt temperature that is lower than the second fibrous layer 150, and may or may not be the same as the melt temperature for the first fibrous layer 140. The third fibrous layer 160 may have a melt temperature that is greater than or less than the melt temperature of the first fibrous layer 140.

The presence of thermoplastic strips or the imbibing of a thermoplastic material into the filtration material undesirably occludes flow in the upstream and downstream drainage layers where the thermoplastic strips (or imbibed thermoplastic material) are present. In addition, the inclusion of thermoplastic strips and/or imbibed thermoplastic material in the filtration material increases the overall thickness of the filtration material, which, in turn, reduces the number of pleats that can be formed in the filtration material for a given device. Increasing the effective amount of filtration material in a filtration device corresponds to an increase in the Effective Filtration Area (EFA). Therefore, a filtration device having a shortened second fibrous layer (downstream drainage layer) may have a larger EFA compared to a conventional filtration material that utilizes a thermoplastic strip or imbibed thermoplastic material with fewer pleats.

Another advantage afforded by the inventive filtration material is that trim processing and/or end cut requirements for suitably sealing a filtration cartridge may be significantly simplified because the extended length of the first fiber layer (i.e., upstream drainage layer) is melted to create a seal with the end caps. In contrast, in conventional filtration devices, an acceptable seal relies on mating the individual pleats with the molten end cap(s). Additionally, because the first fiber layer and end cap(s) are melted, a high degree of unevenness at the cut ends of the filtration material may be accommodated while still producing an integral, sealed filtration cartridge. The use of an "overhanging" fibrous (drainage) layer produces a sealed end cap regardless of the thickness of the drainage layer materials. Further, a larger amount of overhanging material may be melted for thinner backers (e.g., fluorinated ethylene propylene (FEP)) to produce a thicker embed region that may further help stabilize and reinforce such very thin and delicate materials.

Further, in some exemplary embodiments, there may be no need to perform an end trim process (e.g., cutting of the filtration material) in the pleated form when making a filtration cartridge if the raw materials are already prepped and/or cut to adequate dimensions. Such "pre-cutting" can also provide for individual trimming of the filtration media layers or enable cutting processes that are most appropriate to each individual layer as opposed to the challenge of cutting all of the layers once collated or installed in a filtration device (e.g., in a pleated form).

Additionally, as discussed herein, cutting the second fiber layer (i.e., the downstream drainage layer) to the approximate length of the outer cage while leaving the first fiber layer (i.e., the upstream drainage layer) and membrane layer untrimmed and extending or overhanging from the end of the outer cage enables the use of a non-melting drainage layer without the inclusion of thermoplastic strips or the imbibing of thermoplastic material into the filtration material. Eliminating thermoplastic strips removes processes and materials conventionally required, thus simplifying the supply chain and processing of the filtration material. Also, eliminating thermoplastic strips from the filtration medium helps to reduce contamination and/or defects into the filtration media by removing one or more manufacturing step. Additionally, the differing lengths of the drainage layers relative to one another allows for greater heating of only one layer. As a result, materials with differing melt properties may be used.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A filtration material comprising:
   a first fibrous layer having a first length between a first end and a second end of the first fibrous layer;
   a second fibrous layer having a second length between a first end and a second end of the second fibrous layer; and
   a non-meltable porous membrane having said first length and being positioned between said first fibrous layer and said second fibrous layer,
   wherein said second length is less then said first length, and the first end of the first fibrous layer extends beyond the first end of the second fibrous layer, and the second end of the first fibrous layer extends beyond the second end of the second fibrous layer, and
   wherein said filtration material is free of additional thermoplastic material.

2. The filtration material of claim 1, wherein said first fibrous layer is meltable and said second fibrous layer is non-meltable.

3. The filtration material of claim 1, wherein said first and second fibrous layers are meltable.

4. The filtration material of claim 1, wherein said first fibrous layer and said non-meltable porous membrane extend a distance of from about 1 mm to about 50 mm from said second fibrous layer, wherein said second fibrous layer is non-meltable.

5. The filtration material of claim 1 wherein said porous membrane is selected from polytetrafluoroethylene and expanded polytetrafluoroethylene.

6. The filtration material of claim 1, wherein said first and second fibrous layers each comprise a plurality of fibers arranged in a cohesive structure.

7. The filtration material of claim 4, wherein each said cohesive structure comprises a woven structure, a non-woven structure, or a knit structure.

8. The filtration material of claim 1, wherein said first fibrous layer has a melt temperature that is lower than a melt temperature of said second fibrous layer.

9. The filtration material of claim 1, further comprising a third fibrous layer positioned adjacent to said second fibrous layer opposing said porous membrane.

10. The filtration material of claim 9, wherein said third fibrous layer has a length that is substantially the same as the length of said first fibrous layer.

11. The filtration material of claim 9, wherein said third fibrous layer has a melt temperature that is lower than said second fibrous layer.

12. A filter cartridge assembly comprising:
    an outer cage;
    a filtration material having a cylindrical configuration concentrically positioned within said outer cage, said cylindrical filtration material having a first end and a second end and including:
       a first fibrous layer comprising a thermoplastic material and having a first length between a first end and a second end of the first fibrous layer;
       a second fibrous layer having a second length between a first end and a second end of the second fibrous layer;
       and a non-meltable porous membrane having said first length and being positioned between said first fibrous layer and said second fibrous layer
    an inner core member disposed within said filtration material; and
    an end cap bonded to each of said first and second ends of said cylindrical filtration material by the thermoplastic material of the first fibrous layer,
    wherein said filtration material has a pleated configuration containing a plurality of pleats,
    wherein said second length is less then said first length, and the first end of the first fibrous layer extends beyond the first end of the second fibrous layer, and the second end of the first fibrous layer extends beyond the second end of the second fibrous layer, and
    wherein said filtration material is free of additional thermoplastic material.

13. The filtration material of claim 12, wherein said first fibrous layer is meltable and said second fibrous layer is non-meltable.

14. The filtration material of claim 12, wherein said first and second fibrous layers are meltable.

15. The filtration material of claim 12, wherein said first fibrous layer and said non-meltable porous membrane extend a distance greater than about 5 mm from said second fibrous layer, wherein said second fibrous layer is non-meltable.

16. The filtration material of claim 12, wherein said pleats have a substantially V-shaped configuration positioned about and extending along a longitudinal axis of said filtration material.

17. The filtration material of claim 12, wherein said porous membrane is selected from polytetrafluoroethylene and expanded polytetrafluoroethylene.

18. The filtration material of claim 12, wherein said first and second fibrous layers each comprise a plurality of fibers arranged in a cohesive structure.

19. The filtration material of claim 18, wherein each said cohesive structure comprises a woven structure, a non-woven structure, or a knit structure.

20. The filtration material of claim 12, wherein said first fibrous layer has a melt temperature that is lower than a melt temperature of said second fibrous layer.

* * * * *